United States Patent [19]

Allard

[11] Patent Number: 5,429,161
[45] Date of Patent: Jul. 4, 1995

[54] APPARATUS FOR OPTIMUM POSITIONING OF CANTS FOR RESAWING

[75] Inventor: Benoît Allard, Chicoutimi-Nord, Canada

[73] Assignee: Les Ateliers Benoit Allard, Inc., Quebec, Canada

[21] Appl. No.: 133,748

[22] Filed: Oct. 7, 1993

[51] Int. Cl.⁶ .................. B27B 1/00; B27B 31/00
[52] U.S. Cl. .................. 144/246 E; 83/360; 83/367; 83/371; 144/242 R; 144/246 F; 144/249 A; 144/357; 144/378; 198/395; 414/746.7; 364/474.09; 364/560
[58] Field of Search .......... 144/2 R, 3 R, 242 R, 144/242 E, 245 R, 246 R, 246 B, 246 D, 246 E, 246 F, 246 G, 249 R, 249 A, 249 B, 253 F, 356, 357, 377, 378; 83/360, 367, 371; 250/560, 561; 364/474.09, 559, 560; 198/395; 414/746.7

[56] References Cited

U.S. PATENT DOCUMENTS

| | | | |
|---|---|---|---|
| 3,990,568 | 11/1976 | Wilson, Sr. | 144/246 G |
| 4,144,782 | 3/1979 | Lindstrom | 83/367 |
| 4,373,563 | 2/1983 | Kenyon | 144/246 F |
| 4,441,537 | 4/1984 | Vartiainen | 144/378 |
| 4,458,567 | 7/1984 | Tuomaala | 144/378 |
| 4,633,924 | 1/1987 | Hasenwinkle et al. | 144/378 |
| 4,823,851 | 4/1989 | Seffens | 144/242 E |
| 4,881,584 | 11/1989 | Wislocker et al. | 144/378 |
| 4,947,909 | 8/1990 | Stroud | 144/378 |

Primary Examiner—W. Donald Bray
Attorney, Agent, or Firm—Omri M. Behr; Matthew J. McDonald

[57] ABSTRACT

The disclosure herein describes an apparatus for the measuring and positioning of cants and their subsequent feeding to a sawing station. A feed table is used for conveying the cants towards the station and includes a lateral guide against which each cant is positioned. A scanning device measures transverse distances across the planar faces of the cant at intervals during its travel on the feed table. The information is recorded by computer which, in turns, causes the cant to be clamped between live rolls after the scanning and positioned to provide optimum positioning and orientation of the cant relative to the sawing elements.

9 Claims, 3 Drawing Sheets

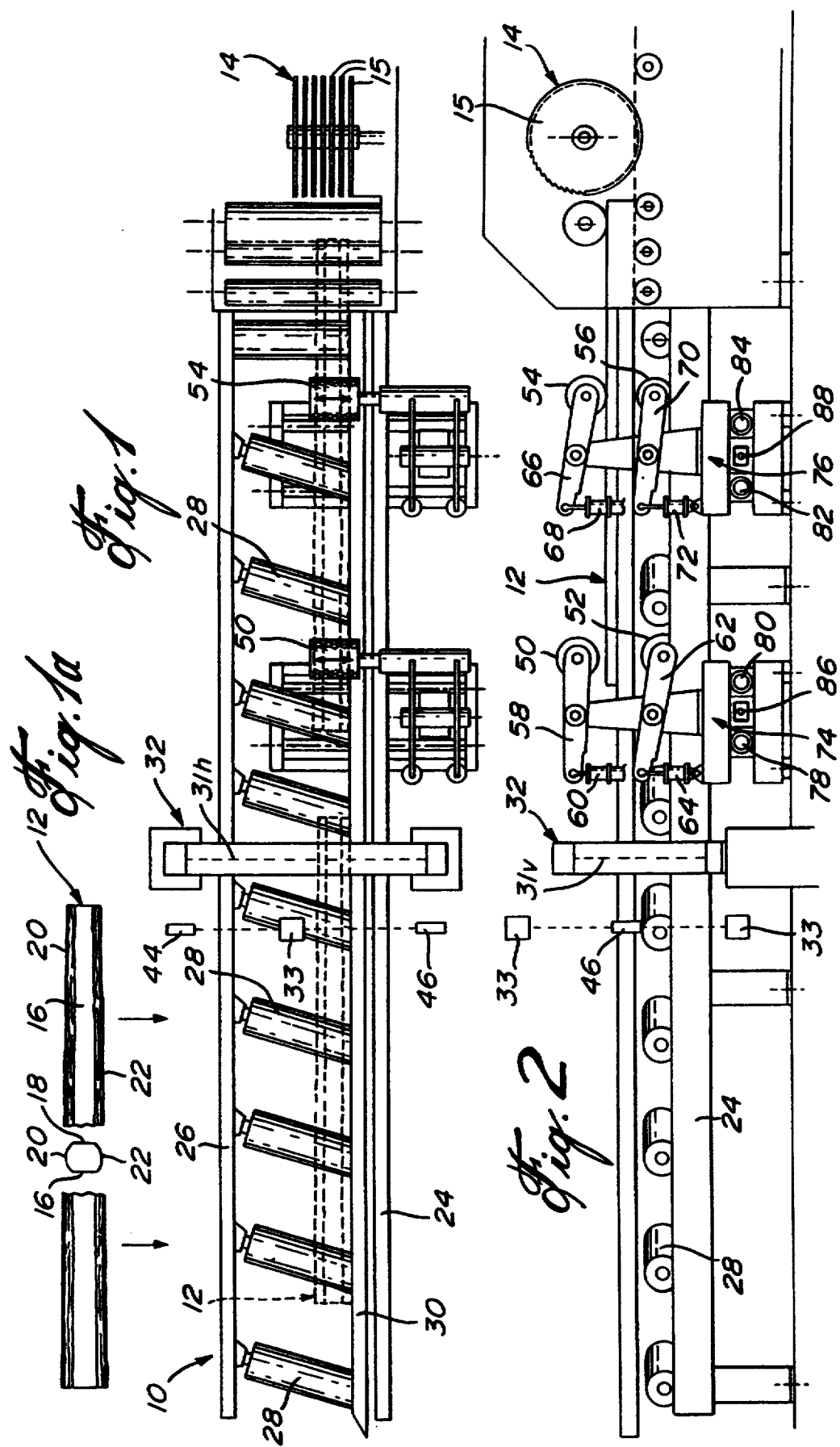

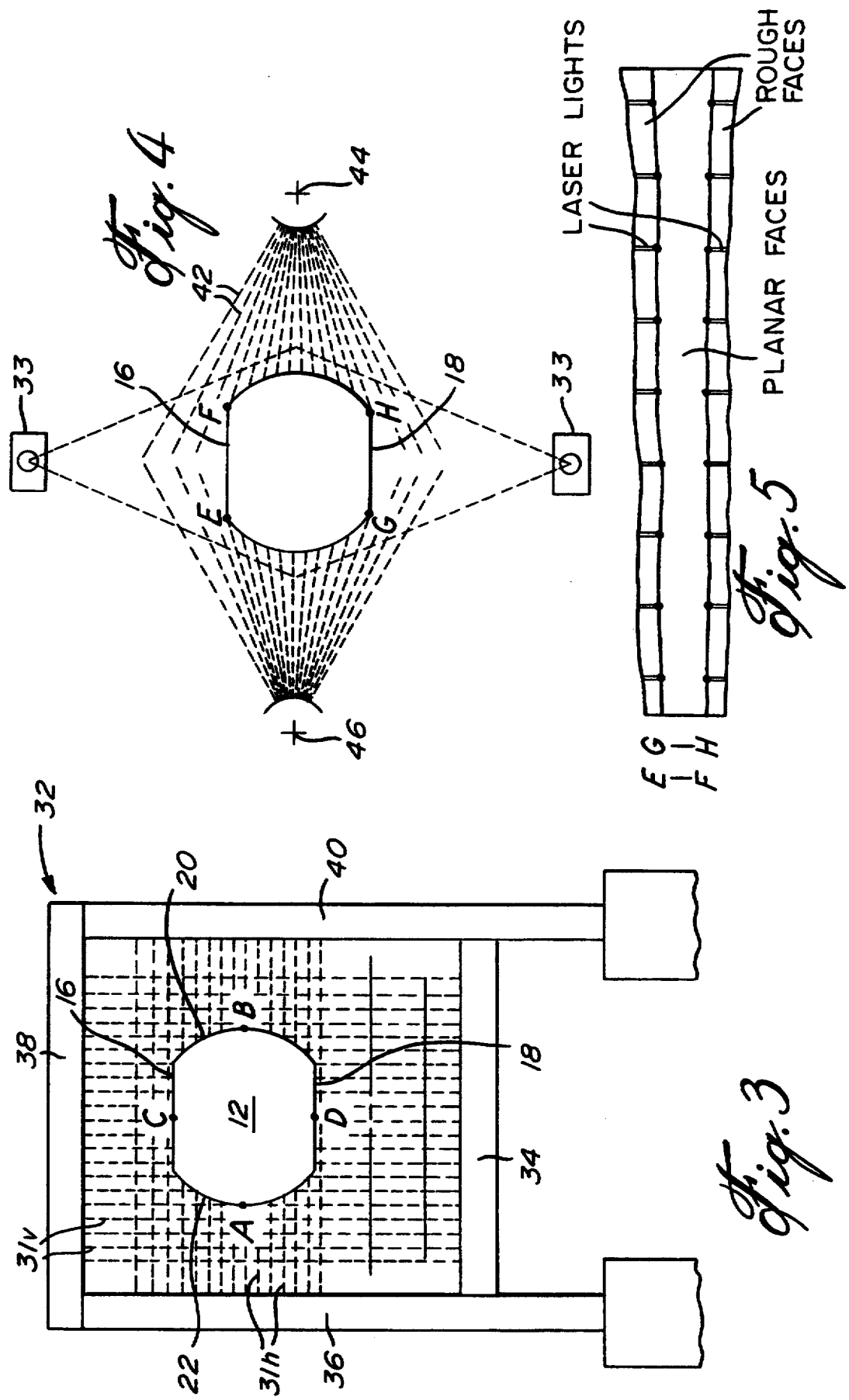

APPARATUS FOR OPTIMUM POSITIONING OF CANTS FOR RESAWING

FIELD OF THE INVENTION

The present invention pertains to an apparatus for positioning cants to optimize their sawing into marketable products.

BACKGROUND OF THE INVENTION

The efficient production of standard dimension lumber and related products such as speciality stock and pulp chips, requires first a basic choice of the sawing pattern appropriate to the log diameter and length. These two characteristic features are readily determined by primary scanning practice. With current technology in use, the actual classification of logs by groups is then fully automatic. A feature which is not taken into account in this basic sorting is the individual form of each log within a particular dimension class, which may greatly alter its lumber potential, especially if any adverse condition, such as crook, twist and taper, is not detected and suitably treated in the sawing process.

OBJECTS AND STATEMENT OF THE INVENTION

It is therefore an object of the present invention to provide, beyond the initial log classification on the basis of size, a further scanning along the processing line to analyze the shape of two-sided cants in order to determine their optimum positioning and orientation with regard to any saw line, previous to resawing.

This feature is achieved in the present invention by providing a system which is able to respond to computerized commands originating from the scanning information; such system is placed in front of the resawing unit in order to cause the workpiece to be processed in the most commercially profitable manner.

It is a further object of the present invention to obtain maximum market product value in the processing of parallel faced cants into commercial lumber and pulp chips.

The present invention therefore relates to an apparatus for positioning cants with respect to sawing elements, each cant having opposite parallel planar faces and opposite rough sides, comprising:
— a longitudinal feed table for conveying cants toward the station;
— lateral guide means fixedly mounted on the table;
— means for positioning a cant against the guide means;
— scanning means to determine the external dimensions of the cant;
— laser means to project light lines on each of the rough sides of the cant;
— photographic means to record position of extremities of the laser light lines at juncture with planar faces;
— means for recording and analysing data originating from the scanning means and the photographic means;
— means downstream of the scanning means for clamping and raising the conveyed cant above the table level; and
— means for displacing the clamping means transversally within the table in accordance with data recorded and analyzed, for optimum positioning of the conveyed cant relative to the sawing elements.

In one embodiment of the invention, the proposed system comprises a longitudinal feed table that moves the cant towards the sawing elements while placing one rough side of the cant against a fixed lateral longitudinal guide by means of skewed rolls. The cant is scanned in the course of its infeed motion while in continuous contact with the lateral guide.

The scanning means first measure the thickness of the cant between the planar faces, thus informing the data recording means of the basic width of lumber to be produced and, secondly, determine rough widths of the cant at set intervals. Then, laser light lines are projected on the rough sides, to be recorded by the photographic means at similar intervals, thus measuring the width of the planar faces found between the extremities of such lines. Substraction of planar face widths from rough widths of the cant at each measurement interval will yield an indication of the width and thickness of the raw material available beyond the planar faces to produce boards narrower than the basic width. Said measurements, repeated simultaneously during the passage of the cant through the scanning means are finally reconstituted, by the computer into a complete profile of each face. From the composite picture of the top and bottom faces considered in their relative position to one another, an optimum product solution is computed from dimensional and commercial parameters for the lumber to be produced, thus establishing a sawing procedure which includes best positioning and orientation of the cant with regard to fixed or movable sawing or cutting planes. In one form of the invention, this latter operation is carried out by means of two pairs of driven top and bottom rolls which press upon the planar faces of the cant, lift it off the bed and shift it sidewise the required amount for optimized cutting, while maintaining its forward motion at the original speed.

Other objects and further scope of applicability of the present invention will become apparent from the detailed description given hereinafter. It should be understood, however, that this detailed description, while indicating preferred embodiments of the invention, is given by way of illustration only, since various changes and modifications within the spirit and scope of the invention will become apparent to those skilled in the art.

IN THE DRAWINGS

FIG. 1 is a top plan view representing schematically the apparatus of the present invention;

FIG. 1a is a schematic representation of a cant being present to the apparatus of FIG. 1.

FIG. 2 is a side elevation view thereof;

FIG. 3 is a schematic elevation showing the measurement of the width and thickness of the cant;

FIG. 4 is a schematic representation illustrating the measurement of the planar faces of the cant;

FIG. 5 is a schematic representation of a planar face profile of the cant; and

DESCRIPTION OF PREFERRED EMBODIMENTS

Figure 6:
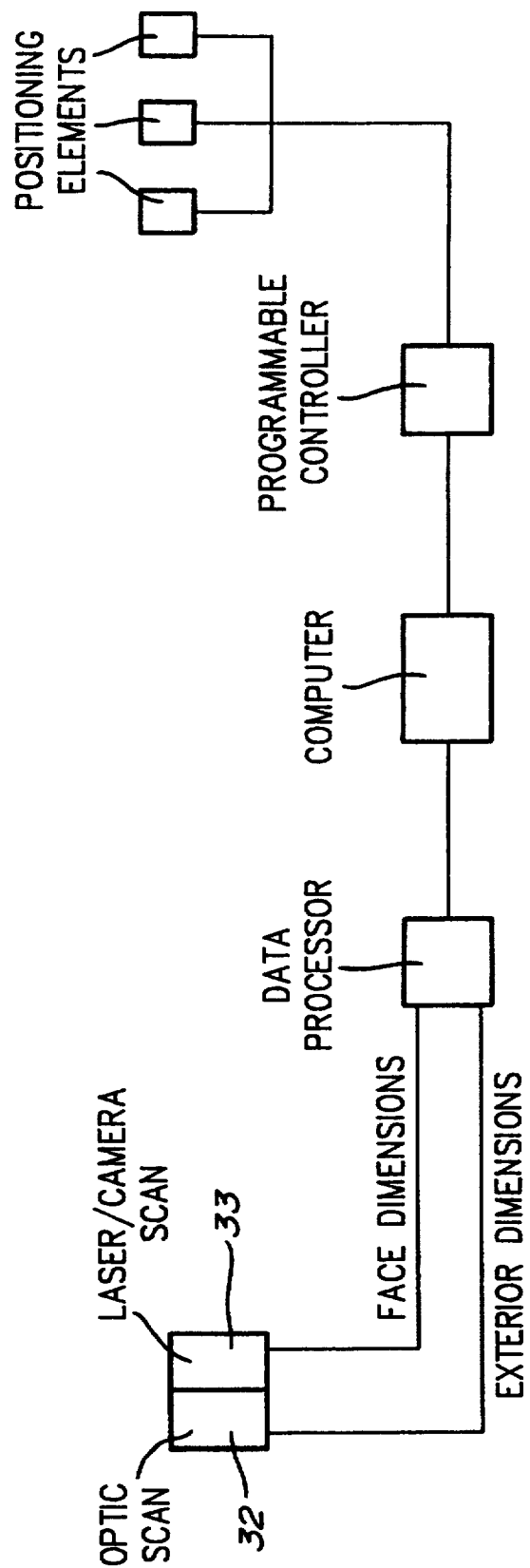
FIG. 6 is a block diagram showing the various steps involved in the system of the present invention.

Referring to FIGS. 1, 1a and 2, there is shown an apparatus, generally denoted 10, for presenting a cant 12 to a sawing station 14 having a series of vertically extending sawing elements 15. The cant is two-sided with opposite parallel planar faces 16 and 18 and opposite rough sides 20 and 22.

The mechanical part of the system includes of a longitudinal infeed table consisting of a parallel sided frame 24 and 26 in which is mounted a series of horizontal carrying driven rolls 28 with axes set obliquely with respect to transversal direction, for the purpose of moving the cant forward and into contact with a lateral linebar 30 fixedly mounted to one side of the table.

The cant 12 is moved through a scanning station 32 for thickness, maximum width, face width and curvature measurements.

Referring to FIGS. 3 and 4, the scanning station gathers dimensional information in two phases. One phase consists of a horizontal and vertical scan as represented by lines 31$h$ and 31$v$ by means of photoelectric cells mounted in the structure 34, 36, 38, 40 of the scanning station to determine the thickness of the cant between the two planar faces 16 and 18 (line C-D) and also, at set intervals, the maximum width externally to the rough sides 20 and 22 (line A-B). The second phase is a scan that measures the width across the flat faces 16 and 18, also at set intervals, by photographic resolution by means of cameras 33 of laser light lines 42 projected horizontally onto each rough side of the cant from laser sources 44, 46, thus locating pairs of points E-F and G-H to determine the transversal dimension across the upper and lower faces 16 and 18.

Referring to FIG. 5, the succession of E-F and G-H lines recorded is reconstituted by computer into a complete outline of each planar face. From the composite picture of the superimposed face contours, and considering the additional volume available beyond such contours as indicated by the first scan, a sawing procedure is then established based on best lateral positioning and angular orientation (skewing) of the workpiece with regard to the cutting planes.

Referring to FIG. 6, the scanning station 32 comprises an optical scan which feeds information on the exterior dimensions of the cant to a data processor. A photographic scan of the laser line projection also feeds information on the planar face dimensions to said processor. From the total data transmitted to it, a computer establishes an optimum product solution which is fed to a programmable controller associated with the positioning elements of the apparatus for optimized cutting.

Following this process, the cant is firmly clamped at a predetermined spacing by two pairs of top and bottom rolls 50, 52 and 54, 56 (see FIG. 2) and lifted out of contact with the bed rolls. Each of these rolls are driven at a speed such as to maintain the same linear displacement of the workpiece imparted by the carrying rolls 28. For clarity purposes, the means for driving rolls 28 and rolls 50, 52, 54, 56 have not been illustrated on the accompanying drawings. The pair of rolls 50, 52 is moved in and out of clamping action through a lever-and-cylinder arrangement 58, 60 and 62, 64, 66. Similarly, the clamping action of rolls 54, 56 is achieved by means of a lever-and-cylinder arrangement 66, 68 and 70, 72. Each pair of rolls is transversally movable on a carriage, generally denoted 74 and 76, mounted on slides 78, 80 and 82, 84 respectively. The lateral movement of each roller carriage is accomplished by means of linear positioners 86, 88 in accordance with the computerized results of the scanning data, thus producing either parallel side travel or skewing of the piece, while maintaining full forward speed.

Therefore, the present invention provides the maximum volume of production and increased value on the market for products obtained from two-sided cant sawing, by the combination of dimensional scanning, computerized imaging and an evaluation of all pertinent physical and commercial factors. Such optimization possibility is further realized by mechanical positioning of the cant according to computerized decisions, such arrangement preventing any slowing down of the feeding process, while maintaining a minimal distance between cants to be sawn.

Although the invention has been described above with respect to one specific form, it will be evident to a person skilled in the art that it may be modified and refined in various ways. It is therefore wished to have it understood that the present invention should not be limited in scope, except by the terms of the following claims.

I claim:

1. An apparatus for positioning cants with respect to sawing elements of a sawing station, each cant having opposite parallel planar faces and opposite rough sides, comprising:

a longitudinal feed table for conveying cants toward said station;

lateral guide means fixedly mounted on said table;

means for positioning a cant against said guide means;

scanning means to determine external dimensions of the cant, said scanning means including:

(1) laser means to project light lines on each of the rough sides of the cant; and, (2) photographic means to record position of extremities of the laser light lines at juncture with planar faces in order to determine planar face widths;

means for recording and analysing data originating from said scanning means and said photographic means;

means downstream of said scanning means for clamping and raising said conveyed cant out of contact with said table; and means for displacing said clamping means transversally within said table in accordance with the data recorded by said data recording and analysing means for optimum positioning of the conveyed cant relative to the sawing elements.

2. An apparatus as defined in claim 1, wherein said scanning means utilize laser rays to determine said planar face widths of the cant at repeated intervals during passage of the cant through the scanning means, the measurements to be recorded by photographic means and reconstituted into a complete profile of each face by computer imaging.

3. An apparatus as defined in claim 1, wherein said displacing means orient the cant in accordance with a composite picture of the superimposed top and bottom face profiles and of the available raw material beyond the boundaries of such faces.

4. An apparatus as defined in claim 1, wherein said longitudinal feed table is composed of obliquely set carrying rolls moving the cant forward and into contact with said lateral guide means.

5. An apparatus as defined in claim 4, wherein said guide means consists of a lateral line bar guide fixed to said table.

6. An apparatus as defined in claim 1, wherein said clamping means consist of two pairs of driven top and bottom rolls, each pair being mounted on transversally movable carriages.

7. An apparatus as defined in claim 1, wherein said displacing means consist of two pairs of live top and bottom rolls, each pair being mounted on transversally movable carriages.

8. An apparatus as defined in claim 6, wherein said displacing means consist of linear positioners causing lateral movement of each carriage along slides in accordance with computer processed scan data.

9. An apparatus as defined in claim 1, wherein said scanning means gather dimensional information in two phases: a first phase consisting of a horizontal and vertical scan by means of photoelectric cells to determine the thickness of a cant between the two planar faces and, at a determined spacing, the maximum width externally of the rough sides; a second phase consisting in measuring the width across the planar faces at said spacing by means of photographic resolution of laser light lines projected horizontally onto each rough side of the cant.

* * * * *